United States Patent
Lin

(10) Patent No.: US 12,537,398 B2
(45) Date of Patent: Jan. 27, 2026

(54) EIGHT-STATOR-POLE, BIPOLAR, 3.6-° HYBRID STEP MOTOR

(71) Applicant: Lin Engineering, Inc., Morgan Hill, CA (US)

(72) Inventor: Ted T. Lin, Saratoga, CA (US)

(73) Assignee: Lin Engineering, Inc., Morgan Hill, CA (US)

( * ) Notice: Subject to any disclaimer, the term of this patent is extended or adjusted under 35 U.S.C. 154(b) by 268 days.

(21) Appl. No.: 18/217,923

(22) Filed: Jul. 3, 2023

(65) Prior Publication Data
US 2024/0266888 A1  Aug. 8, 2024

Related U.S. Application Data

(60) Provisional application No. 63/443,984, filed on Feb. 8, 2023.

(51) Int. Cl.
*H02K 1/14* (2006.01)
*H02K 37/04* (2006.01)
*H02K 37/14* (2006.01)

(52) U.S. Cl.
CPC ............ *H02K 1/146* (2013.01); *H02K 37/04* (2013.01); *H02K 37/14* (2013.01); *H02K 2213/03* (2013.01)

(58) Field of Classification Search
CPC ........ H02K 1/146; H02K 37/04; H02K 37/14; H02K 2213/03
USPC ............ 310/49.44, 49.37, 216.092, 216.094
See application file for complete search history.

(56) References Cited

U.S. PATENT DOCUMENTS

| | | | |
|---|---|---|---|
| 9,006,941 B2 | 4/2015 | Zhao | |
| 9,172,292 B2 | 10/2015 | Yoshida et al. | |
| 9,172,293 B2 | 10/2015 | Yoshida et al. | |
| 10,090,746 B2 | 10/2018 | Lin et al. | |
| 10,855,161 B2 | 12/2020 | Lin et al. | |
| 2005/0194846 A1* | 9/2005 | Sakamoto | H02P 8/14 310/156.64 |
| 2011/0156506 A1* | 6/2011 | Zhao | H02K 37/14 310/49.53 |
| 2011/0304225 A1* | 12/2011 | Terashita | H02K 1/185 310/49.37 |
| 2013/0249331 A1* | 9/2013 | Yoshida | H02K 37/18 310/49.37 |
| 2017/0110953 A1* | 4/2017 | Lin | H02K 37/18 |
| 2018/0269763 A1* | 9/2018 | Lin | H02K 1/146 |

* cited by examiner

*Primary Examiner* — Michael Andrews
(74) *Attorney, Agent, or Firm* — Mark Protsik; Thomas Schneck

(57) ABSTRACT

A two-phase bipolar 3.6° step motor is described in which the stator winding assembly has eight stator poles organized into decoupled phase groups with two distinct angular pole separations, 14.4°×[(4n±1)/4] between poles of the same group, and 14.4°×[(4m±1)/2] between adjacent poles of different groups, where n and m are positive whole numbers. Three stator teeth on each stator pole have a stator tooth pitch of 13.2° to minimize detent torque for smoother, more accurate stepping. A rotor has alternating magnetic north and south rotor teeth around a circumference thereof with a 14.4° rotor tooth pitch angle. The stator poles are wound with electromagnetic coil windings that can be driven in a series of phases to magnetically interact with the rotor.

13 Claims, 6 Drawing Sheets

EIGHT-STATOR-POLE, BIPOLAR, 3.6-° HYBRID STEP MOTOR

CROSS-REFERENCE TO RELATED APPLICATION

This application claims priority under 35 U.S.C. 119 (e) from U.S. provisional application 63/443,984, filed Feb. 8, 2023.

TECHNICAL FIELD

The present invention relates to step motors, wherein a rotor driven by a stator rotates step-by-step between successive electromagnetic detent positions, and more particularly to motors having at least 3° full step angles (at most 120 steps per revolution), with emphasis on increasing motor efficiency for optimal holding torque.

BACKGROUND ART

Two-phase bipolar step motors have been used in the motion control industry, starting first in the early 1980s with a 3.6° step motor (100 full steps per revolution). The 3.6° stepper was very popular early in step motor history because it can run at a good speed. A bigger step size with the same pulse rate provides a higher speed in terms of revolution per second. Indeed, 3.6° is still the favored step size for many high-speed applications that need only low directional resolution, provided a high dynamic and holding torque is not needed. Unfortunately, although it moves 3.6° per step (double that of a 1.8° stepper), the resolution and torque are not favorable for many applications. So, it has gradually been replaced by 1.8° steppers in most cases. For example, although orienting of communication devices, surveillance cameras, and stage lighting, generally need only relatively low directional resolution, they also require an adequate torque from the motors to be able to reorient such equipment at a useful speed.

The available 3.6° step motors in the industry are four-stator-pole designs, with either four or five stator teeth per pole and a 14.4° standard tooth pitch angle (3.6°×4 phases). FIG. 1 shows the stator for a conventional 3.6° step motor with 4 stator teeth per pole, while FIG. 2 shows the stator for another conventional 3.6° step motor with 5 stator teeth per pole. The total number of stator teeth interacting with the rotor per phase is only 8 or 10. Torque depends upon the number of stator teeth interacting with the rotor. Additionally, four-stator-pole designs are low efficiency due to long magnetic flux paths. The poor magnetic flux utilization tends to produce steppers with dynamic and holding torques that are inadequate for the types of motor applications mentioned above.

U.S. Pat. No. 10,090,746 to Lin et al. describes small size, 8-pole, 2-phase bipolar step motors, including one with 104 steps per revolution (3.461538 . . . ° full steps) and 3 teeth per stator pole for a total of 24 stator teeth, 12 of which interact with the rotor per phase. Likewise, U.S. Pat. No. 10,855,161 describes several stepper motors that maximize holding torque by having the number of stator teeth be the same as or larger than the number of rotor teeth. This happens only with certain step angles. The disclosed embodiments include 8-stator-pole steppers with 56, 88 and 120 full steps per revolution (6.428571 . . . °, 4.0909 . . . °, and 3° steps), as well as another 8-stator pole stepper with non-uniform pole spacings (a 64-stepper with 5.625° full steps). However, many customers are reluctant to choose motors with unusual step angles, so only the 3° stepper is expected to have much success. The approaches discussed in those patents are specific to certain step angles and are not known to be applicable to 3.6° step motors. Indeed, it is generally regarded in the industry as true, that to satisfy essential step motor design criteria, 3.6° step motors must have four stator poles and that any eight-stator-pole designs would be impossible.

SUMMARY DISCLOSURE

A two-phase bipolar 3.6-degree step motor with eight stator poles is provided to develop more torque. This is made possible in part by having the stator poles be not equally distributed every 45° around the rotor but instead having two distinct stator pole spacings that meet specified design constraints. Additionally, the stator poles are organized into magnetically decoupled phase groups. The one-phase ON positions are not aligned with any natural detent position, and only 50% of the two-phase ON positions are so aligned. Therefore, the motor can be easily pulled away from natural detent positions for smoother motion at both low and high speed.

A rotor has 25 magnetic north rotor teeth and 25 magnetic south rotor teeth arranged alternately around a circumference thereof with a 14.4° rotor tooth pitch angle. The rotor fits within a stator winding assembly and is seated by bearings on an axial shaft to rotate within the stator winding assembly. The stator winding assembly has a stator with eight stator poles wound with electromagnetic coil windings that can be driven in a series of phases to magnetically interact with the rotor. The stator has three stator teeth per pole for a total of 24 stator teeth, wherein the three stator teeth on each stator pole may have a stator tooth pitch of 13.2° to minimize detent torque.

The eight stator poles are organized into four phase groups. Center lines between pairs of poles of the same group are separated by 14.4°×[(4n±1)/4], such as 39.6°, and center lines between poles of adjacent groups are separated by 14.4°×[(4m±1)/2], such as 50.4°, to decouple phases of adjacent phase groups, where n and m are positive whole numbers, not necessarily the same.

The eight stator poles are successively: a pole a1 with a forward winding direction, a pole b1 with a reverse winding direction, a pole b2 with a forward winding direction, a pole a2− with a reverse winding direction, a pole a3 with a reverse winding direction, a pole b3 with a forward winding direction, a pole b4 with a reverse winding direction, and a pole a4− with a forward winding direction. The poles a1 and b1 form a phase A group, the poles b2 and a2− form a phase B group, the poles a3 and b3 form a phase A− group, and the poles b4 and a4− form a phase B− group, the windings for each phase group being electrically connected. The series of phases driving the stator pole windings comprise a cyclic half-stepping sequence of A+→(A+ B+)→B+→(B+ A−)→A−→(A− B−)→B−→(B− A+)→ . . . then back to the beginning of that sequence, where + designates current applied in a first direction to the respective windings of designated groups and − designates current applied in a second direction to the respective windings of designated groups that is opposite the first direction. The windings can be driven in a micro-stepping mode with variable current amplitudes, if desired.

DETAILED DESCRIPTION

Figure 1:
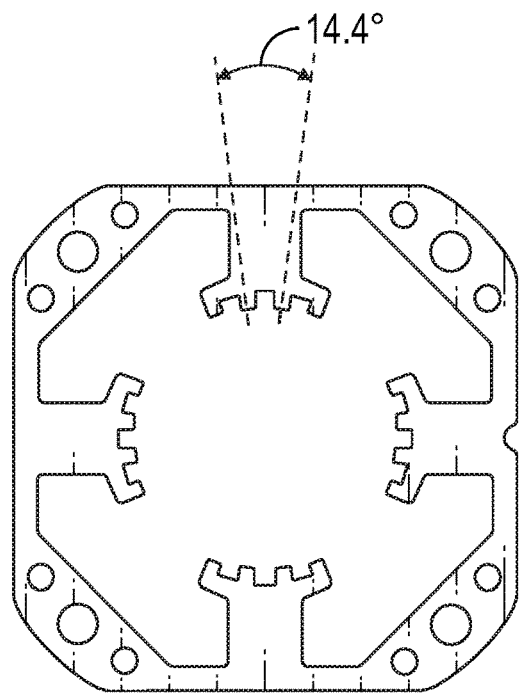
FIGS. 1 and 2 are plan views of typical stator lamination plates for constructing stator assemblies for conventional 3.6° stepper motors according to the prior art. There are four stator teeth per pole in FIG. 1 and five stator teeth per pole in FIG. 2, where the stator teeth have a standard pitch of 14.4°.
Figure 2:
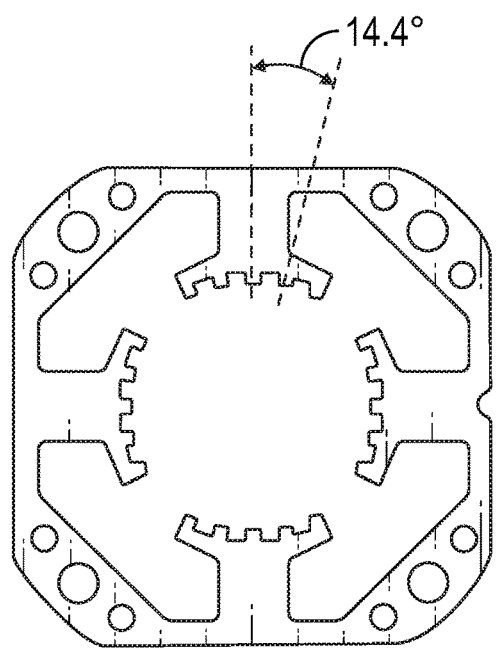
Figure 3:
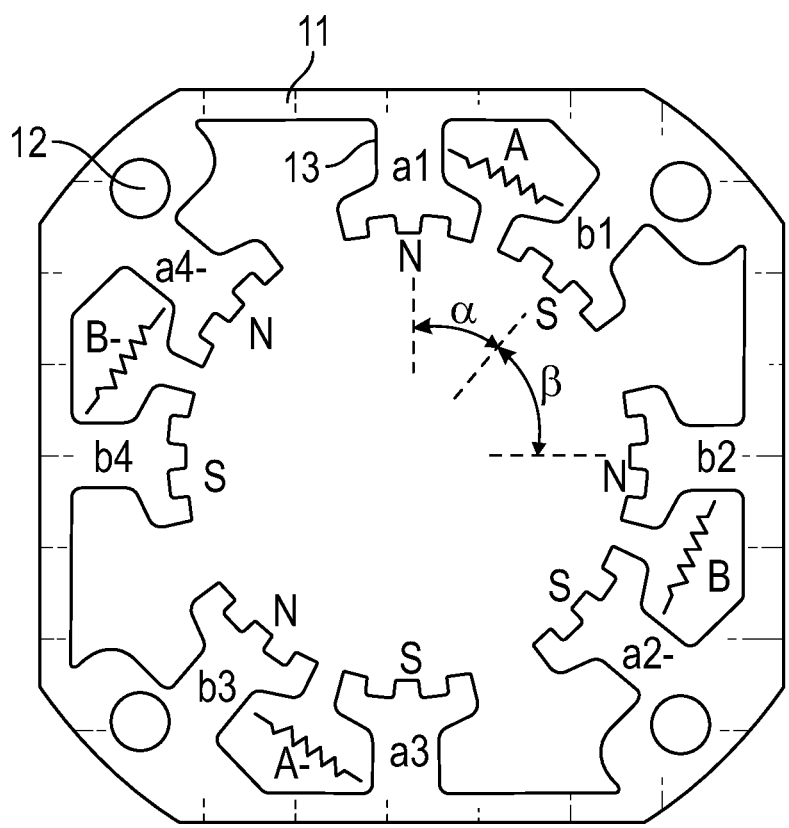
FIG. 3 is a plan view of a stator lamination plate for constructing a stator assembly of a 3.6° stepper motor according to the present invention, wherein there are eight stator poles organized into four phase groups A, B, A−, and B−, with three stator teeth per pole for a total of 24 stator teeth. The eight poles are not equally spaced at 45° from one another, but rather center lines between stator poles of the same phase group have a first angular separation α, while center lines between adjacent poles of different phase groups have a second angular separation β.

With reference to FIG. 3, a stator lamination plate 11 is seen. As is well known in this field, multiple identical plates 11 are stacked and bound together (e.g., with pins through matching registration holes 12) then the respective poles 13 are wound with conductive wiring according to a desired winding pattern to construct an electromagnetic stator assembly.

Eight stator poles 13 are provided, but they are not equally spaced at 45° angular separations. Rather, the poles are organized into four phase groups, designated A, B, A−, and B−, with two stator poles assigned to each group. Stator poles a1 and b1 are assigned to phase group A, stator poles b2 and a2− are assigned to phase group B, stator poles a3 and b3 are assigned to phase group A− (which is located directly opposite phase group A), and stator poles b4 and a4− are assigned to phase group B− (which is located directly opposite phase group B). In the figure, north and south magnetic polarities N and S are indicated in front of each stator pole, which represent that polarity which would present from that pole whenever a positive drive current is applied to that pole's windings, and therefore indicate the winding direction associated with each stator pole. Accordingly, stator poles a1, b2, b3, and a4− are wound in a "forward" direction around those poles, while stator poles b1, a2−, a3, and b4 are wound in a "reverse" direction around those poles, where "forward" and "reverse" are simply relative directions with respect to one and another according to convention. It is well known that driving stepper motors, not all poles will have current always applied, and typically will also be applied in a negative current direction at other times according to a designed drive sequence. Thus, indicated magnetic polarities are not always present and may be reversed at certain stages in a drive sequence.

Drive sequences include full stepping modes, in either one phase ON or two phase ON sequences, as well as half stepping modes. A one phase ON full stepping mode has a drive sequence of A+→B+→A−→B−→ . . . then back to the beginning of that sequence. A two phase ON full stepping mode has a drive sequence of (A+ B+)→(B+ A−)→(A− B−)→(B− A+)→ . . . then back to the beginning of that sequence. A half stepping mode has a drive sequence of A+→(A+ B+)→B+→(B+ A−)→A−→(A− B−)→B−→(B− A+)→ . . . then back to the beginning of that sequence, alternating between one phase ON and two phase ON stages. Additionally, micro-stepping modes may be applied, where the drive currents are not only full ON (maximum current amplitude) and full OFF (zero current amplitude), but also include partial or reduced current from their peak amplitudes. We now describe each of the stages in the half stepping drive sequence.

Drive stage A+ has positive drive current applied to the windings for poles a1 and b1 of phase group A, and poles a3 and b3 of phase group A−. No current is applied to any of the other poles' windings. Drive stage (A+ B+) has positive drive current applied to the windings for poles a1 and b1 of phase group A, poles a3 and b3 of phase group A−, poles b2 and a2− of phase group B, and poles b4 and a4− of phase group B−. The magnetic polarities are what is shown in the figure for all poles. Drive stage B+ has positive drive current applied to the windings for poles b2 and a2− of phase group B, and poles b4 and a4− of phase group B−. No current is applied to any of the other poles' windings. Drive stage (B+ A−) has positive drive current applied to the windings for poles b2 and a2− of phase group B, and poles b4 and a4− of phase group B− and has negative drive current (i.e., in the reverse direction from positive drive current) applied to the windings for poles a1 and b1 of phase group A, and poles a3 and b3 of phase group A−. The magnetic polarities for the phase group A and A− poles are now the reverse of what is indicated in the figure. Drive stage A− has negative drive current applied to the windings for poles a1 and b1 of phase group A, and poles a3 and b3 of phase group A−. No current is applied to any of the other poles' windings. Drive stage (A− B−) has negative drive current applied to the windings for poles a1 and b1 of phase group A, poles a3 and b3 of phase group A−, poles b2 and a2− of phase group B, and poles b4 and a4− of phase group B−. The magnetic polarities for all poles are now the reverse of what is indicated in the figure. Drive stage B− has negative drive current applied to the windings for poles b2 and a2− of phase group B, and poles b4 and a4− of phase group B−. No current is applied to any of the other poles' windings. Drive stage (B− A+) has negative drive current applied to the windings for poles b2 and a2− of phase group B, and poles b4 and a4− of phase group B− and has positive drive current applied to the windings for poles a1 and b1 of phase group A, and poles a3 and b3 of phase group A−. The sequence then returns to the beginning (drive stage A+) and repeats.

Thus, the full sequence starts with positive current applied to the windings of phase groups A and A−, then adds in positive current applied to phase groups B and B−, then first removes the current from the phase groups A and A− and then applies negative current to those same phase groups A and A−, then removes the current from the phase groups B and B− and then applies negative to current to those same phase groups B and B−, then again removes the current from the phase groups A and A− and then applies positive current to those same phase groups A and A−, then removes the current from the groups B and B−, at which point the sequence starts over. For micro-stepping modes, the applying and removing of positive or negative current will instead be a ramping up and down of current amplitudes to the respective phase groups in place of the simple ON-OFF switching of applied currents.

Turning again to the stator pole structure in FIG. 3, pairs of poles of the same phase group are separated by a first angle α. Specifically, the center lines between pairs of poles of the same group are separated by $14.4° \times [(4n \pm 1)/4]$, where n is a positive whole number. Adjacent poles in different phase groups are separated by a second angle β. Specifically, the center lines between poles of adjacent groups are separated by $14.4° \times [(4m \pm 1)/2]$, where m is a positive whole number, not necessarily the same as n. For example, if n=3 and m=2, then α=39.6° and β=50.4°. Alternatively, if n=4 and m=1, then α=54.0° and β=36.0°. But most other possibilities (such as n=2 and m=2 for α=25.2° and β=64.8°, and n=5 and m=1 for α=68.4° and β=21.6°) require not more than two stator teeth per pole to make the poles fit and so, though they are theoretically possible constructions, do not offer any advantage over the prior art four-pole embodiments.

During the stepping drive sequence, because of the two distinct sets of angular pole separations α and β, one-phase ON positions are not in-line with natural detent positions and two-phase ON positions are only 50% in-line with natural detent positions, the other 50% being out-of-phase from the natural detent positions. Therefore, the rotor can be easily pulled away from the natural positions for smooth motion and step accuracy. Each phase group has its own independent magnetic flux path. The new design decouples the phases of adjacent groups.

Figure 4A:
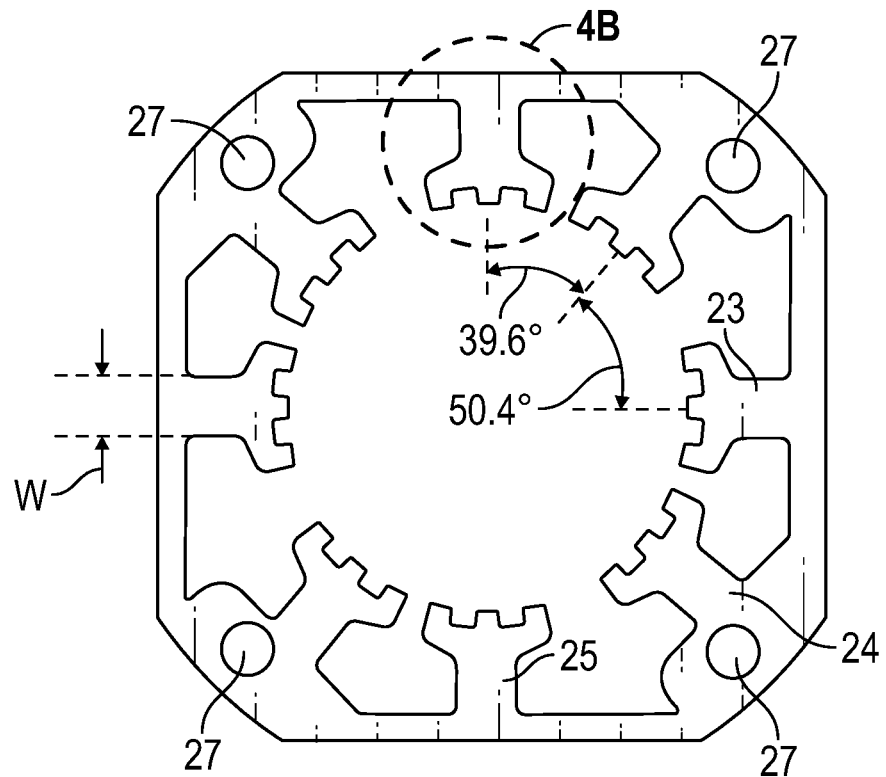
FIGS. 4A and 4B are respective plan view and an enlarged portion of a specific stator lamination plate for an embodiment of the present invention wherein the first angular separation α is 39.6° and the second angular separation β is 50.4°. The enlarged portion of FIG. 4B, taken within the circular arc 4B-4B in FIG. 4A, reveals a modified stator tooth pitch of 13.2° for detent torque reduction and smoother stepping operation.

With reference to FIG. 4A, the specific embodiment where α=39.6° and β=50.4° is preferred. The center-to-center lines between poles of the same phase group, such as poles 23 and 24, are separated by 39.6°. The center-to-center lines between adjacent poles of different phase groups, such as poles 24 and 25, are separated by 50.4°. Collectively, this means that adjacent phase groups have an angular pitch of 39.6°+50.4°=90°. The stator poles 23, 24, 25, . . . , have typical widths W of about 3.60 to 3.75 mm where the windings would be wound, and shoe widths S at the interface with the rotor of about 6.0 mm, but this depends on the motor size (e.g., 42.2 mm square, a rotor outer diameter of about 21.80 mm, and a stator inner diameter of about 21.84 mm). Other motor sizes would have different dimensions.

For the windings, a typical wire size is 0.3 mm diameter with a rated current of 1.5 Amperes. There may be 9 turns of the wires wound around each stator pole, but this can vary. Likewise, the perimeter of the stator laminate plates can be about 3.1 to 3.6 mm wide, which is sufficient to convey magnetic flux between the pairs of stator poles of the same phase group. Each phase group has its own independent flux path.

Registration holes 27 for pins tying multiple stator lamination plates together are in the four corners of the motor. A typical (axial) stack length is about 20 mm.

Figure 4B:
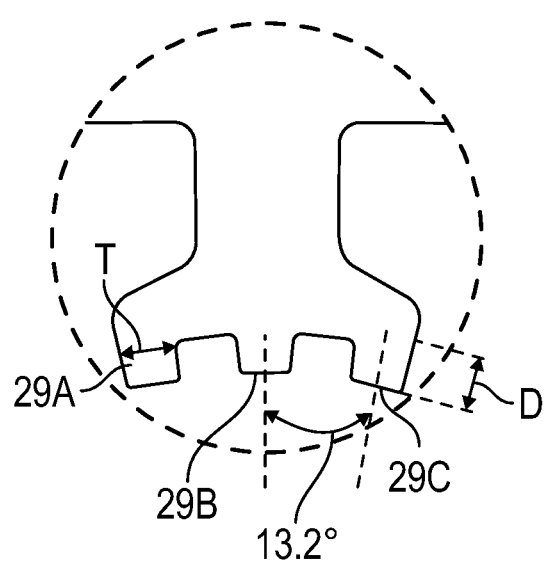

With reference to FIG. 4B, each stator pole has three stator teeth 29A, 29B, 29C. Each stator tooth typically has a width T of 1.20 mm±0.01 mm. Each stator tooth as a typical depth D of about 1.60 mm±0.01 mm. The stator tooth pitch is 13.2° compared to a rotor tooth pitch of 14.4°. This 10% difference ensures that detent torque is minimal for smoother stepping operation of the motor. Other representative dimensions are given in FIGS. 4A and 4B.

Figure 5A:
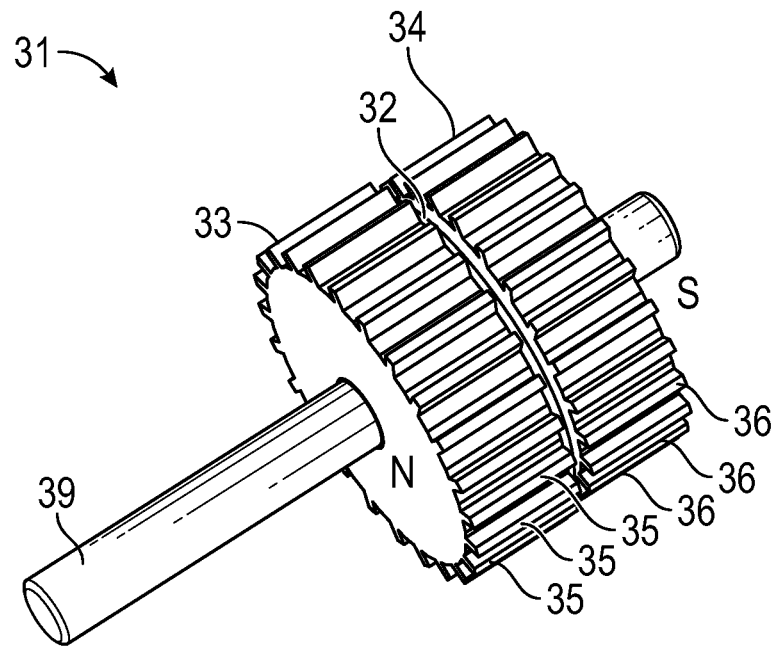
FIG. 5A is a perspective view of a hybrid type rotor for use in a stepper motor of the present invention.
Figure 5B:
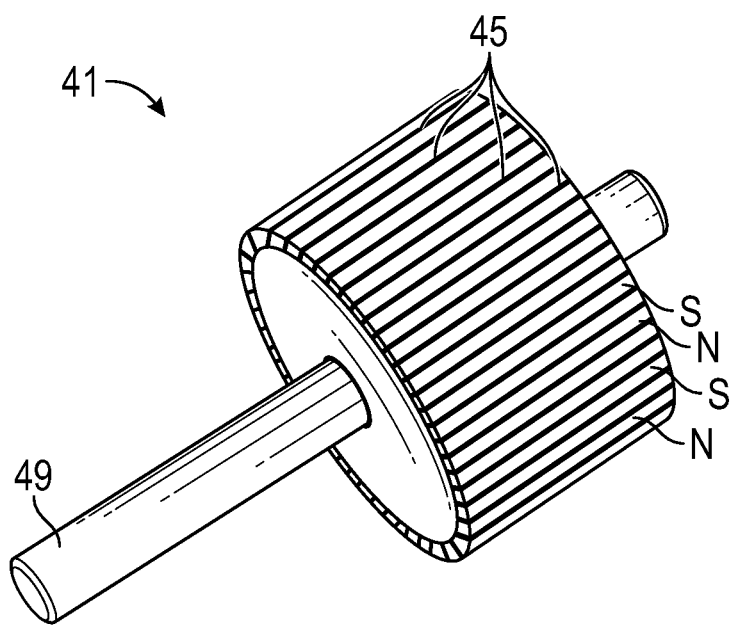
FIG. 5B is a perspective view of an alternative permanent magnet type rotor for use in a stepper motor of the present invention.

With reference to FIGS. 5A and 5B, the rotor can be either of the hybrid rotor type or of the permanent magnet type. In FIG. 5A, a hybrid type rotor 31 has a disk magnet 32 sandwiched between two rotor sections 33 and 34. Salient rotor teeth 35 on the outer diameter of first rotor section 33 are offset by one-half pitch from salient rotor teeth 36 on the outer diameter of second rotor section 34. There are twenty-five rotor teeth 35 and 36 on each rotor half 33 and 34. Because of the disk magnet 32, rotor teeth 35 have one magnetic polarity (e.g., N) while the rotor teeth 36 have the opposite magnetic polarity (e.g., S). Thus, there are twenty-five N-S pairs of rotor teeth with an overall rotor tooth pitch of 14.4°. The rotor tooth width is typically 1.25 mm. Everything is mounted for rotation upon an axial shaft 39. For the alternative permanent magnet type rotor 41 in FIG. 5B, linear strips 45 of permanent magnets of alternating (outward facing) magnetic polarity are laid out around the outer circumference of the rotor, each strip 45 being about 1.25 mm wide in a typical embodiment. Again, the rotor is mounted for rotation on an axial shaft 49.

Figure 6:
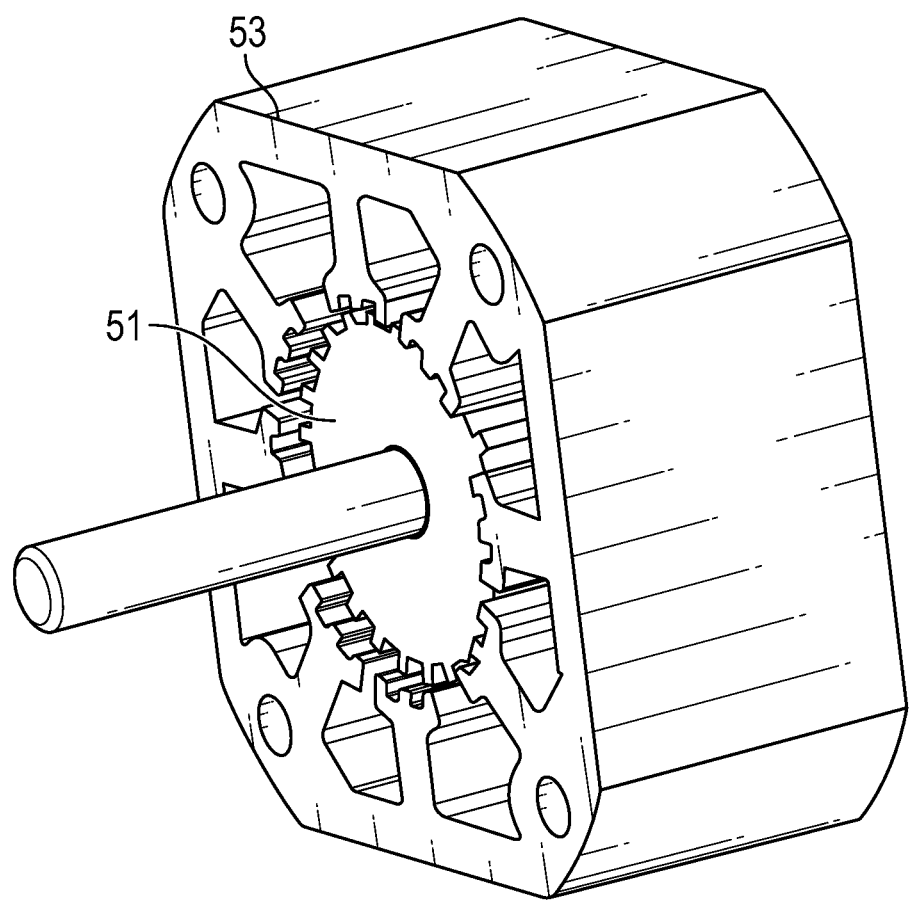
FIG. 6 is a perspective view of a stepper motor comprising a rotor within a stator assembly constructed from a stack of stator lamination plates according to the present invention.

With reference to FIG. 6, rotor 51 is mounted within the assembled stator stack 53. It interacts with the electromagnetic flux generated by the stator windings to rotate in successive steps. In a typical construction, the finished rotor outer diameter (greatest outward extent of rotor teeth) and the finished stator inner diameter (greatest inward extend of stator teeth) have a controlled air gap of about 0.04 mm within standard design tolerances.

Figure 7:
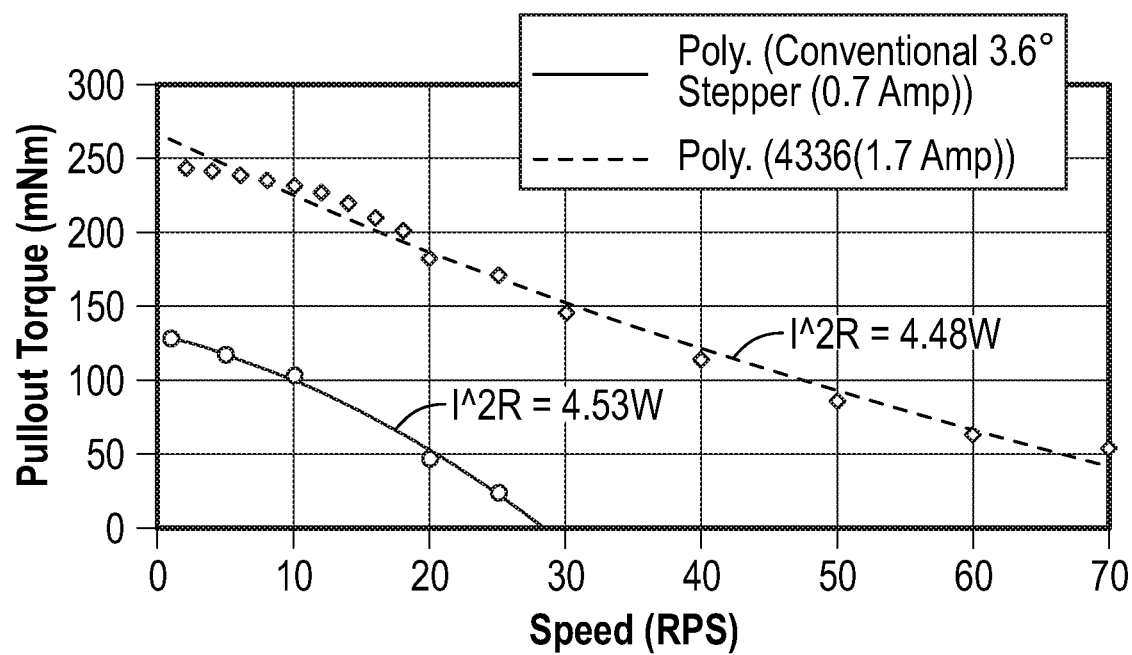
FIG. 7 is a graph of pullout torque (in mN-m) versus motor stepping speed (in rps) for both a conventional 3.6° stepper motors according to the prior art and a 3.6° stepper motors according to the present invention with comparable rated power input or $I^2R$ heat dissipation between the two motors, demonstrating a substantial performance improvement of the invention.

With reference to FIG. 7, the performance of the new motor was tested at different current inputs and compared to the performance of a conventional 3.6° stepper. For fair comparison, the $I^2R$ heat dissipation, which represents rated power input regardless of current, is comparable (4.48 W for the new motor, 4.53 W for the prior art motor). With the same power input, the new stepper operates at 1.7 Amp/phase, while the prior art stepper operates at 0.7 Amp/phase. Then, comparing the resulting pullout torque at each rotational speed, we find substantial torque improvement with the present invention. For example, at 20 rps, performance is improved by 385% (190 mN-m pullout torque versus 50 mN-m pullout torque). Additionally, the new motor can run at substantially higher speeds (e.g., at 70 rps).

The invention claimed is:

1. A two-phase bipolar 3.6-degree step motor, comprising:
a rotor having 25 magnetic north rotor teeth and 25 magnetic south rotor teeth arranged alternately around a circumference thereof with a 14.4° rotor pitch angle of magnetic north-south rotor teeth pairs, the rotor fitting within a stator winding assembly and seated by bearings on an axial shaft to rotate within a stator winding assembly; and
the stator winding assembly having a stator with eight stator poles wound with electromagnetic coil windings that can be driven in a series of phases to magnetically interact with the rotor, the stator having three stator teeth per pole for a total of 24 stator teeth,
wherein the eight stator poles are organized into four phase groups, center lines between pairs of poles of the same group being separated by $14.4° \times [(4n \pm 1)/4]$, center lines between poles of adjacent groups being separated by $14.4° \times [(4m \pm 1)/2]$ to decouple phases of adjacent phase groups, where n and m are positive whole numbers.

2. The step motor as in claim 1, wherein n=3, m=2, center lines between pairs of poles of the same group are separated by 39.6° and center lines between poles of adjacent groups are separated by 50.4°.

3. The step motor as in claim 2, wherein the three stator teeth on each stator pole have a stator tooth pitch of 13.2° to minimize detent torque.

4. The step motor as in claim 1, wherein the eight stator poles are successively a pole a1 with a forward winding direction, a pole b1 with a reverse winding direction, a pole b2 with a forward winding direction, a pole a2− with a reverse winding direction, a pole a3 with a reverse winding direction, a pole b3 with a forward winding direction, a pole b4 with a reverse winding direction, and a pole a4− with a forward winding direction, the poles a1 and b1 forming a phase A group, the poles b2 and a2− forming a phase B group, the poles a3 and b3 forming a phase A− group, and the poles b4 and a4− forming a phase B− group, windings for each phase group being electrically connected.

5. The step motor as in claim 4, wherein the series of phases driving the stator pole windings comprise a cyclic half-stepping sequence of A+→(A+ B+)→B+→(B+ A−)→A−→(A− B−)→B−→(B− A+)→ . . . then back to the beginning of that sequence, where + designates current applied in a first direction to the respective windings of designated groups and − designates current applied in a second direction to the respective windings of designated groups that is opposite the first direction.

6. The step motor as in claim 5, wherein the windings are driven in a micro-stepping mode with variable current amplitudes.

7. The step motor as in claim 1, wherein the rotor is a hybrid type rotor having a disk magnet sandwiched between two rotor sections mounted on the axial shaft, each rotor section having a set of 25 salient rotor teeth, the teeth of one rotor section being offset by one-half rotor tooth pitch from the teeth of the other rotor section.

8. The step motor as in claim 1, wherein the rotor is a permanent magnet type rotor having a cylindrical rotor core mounted on the axial shaft and with a set of 50 linear magnetic strips with 25 pairs of radially-outward facing, alternating north and south magnetic polarities around a circumference of the rotor core.

9. A two-phase bipolar 3.6-degree step motor, comprising:
a rotor having 25 magnetic north rotor teeth and 25 magnetic south rotor teeth arranged alternately around a circumference thereof with a 14.4° rotor pitch angle of magnetic north-south rotor teeth pairs, the rotor fitting within a stator winding assembly and seated by bearings on an axial shaft to rotate within a stator winding assembly; and the stator winding assembly having a stator with eight stator poles wound with electromagnetic coil windings that can be driven in a series of phases to magnetically interact with the rotor, the stator having three stator teeth per pole for a total of 24 stator teeth, the three stator teeth on each stator pole having a stator tooth pitch of 13.2°;

wherein the eight stator poles are organized into four phase groups, center lines between pairs of poles of the same phase group being separated by 39.6° and center lines between poles of adjacent phase groups being separated by 50.4° to decouple phases of adjacent phase groups, and wherein the eight stator poles are successively a pole a1 with a forward winding direction, a pole b1 with a reverse winding direction, a pole b2 with a forward winding direction, a pole a2− with a reverse winding direction, a pole a3 with a reverse winding direction, a pole b3 with a forward winding direction, a pole b4 with a reverse winding direction, and a pole a4− with a forward winding direction, the poles a1 and b1 forming a phase A group, the poles b2 and a2− forming a phase B group, the poles a3 and b3 forming a phase A− group, and the poles b4 and a4− forming a phase B− group, windings for each phase group being electrically connected.

10. The step motor as in claim 9, wherein the series of phases driving the stator pole windings comprise a cyclic half-stepping sequence of A+→(A+ B+)→B+→(B+ A−)→A−→(A− B−)→B−→(B− A+)→ . . . then back to the beginning of that sequence, where + designates current applied in a first direction to the respective windings of designated groups and − designates current applied in a second direction to the respective windings of designated groups that is opposite the first direction.

11. The step motor as in claim 10, wherein the windings are driven in a micro-stepping mode with variable current amplitudes.

12. The step motor as in claim 9, wherein the rotor is a hybrid type rotor having a disk magnet sandwiched between two rotor sections mounted on the axial shaft, each rotor section having a set of 25 salient rotor teeth, the teeth of one rotor section being offset by one-half rotor tooth pitch from the teeth of the other rotor section.

13. The step motor as in claim 9, wherein the rotor is a permanent magnet type rotor having a cylindrical rotor core mounted on the axial shaft and with a set of 50 linear magnetic strips with 25 pairs of radially-outward facing, alternating north and south magnetic polarities around a circumference of the rotor core.

* * * * *